United States Patent [19]

Chen

[11] Patent Number: 4,714,370

[45] Date of Patent: Dec. 22, 1987

[54] COMMODITY SHELF ADAPTORS

[76] Inventor: Geng-Nong Chen, No. 56, Alley 22, Lane 157, Sec. 5 Fu An Road, Tainan City, Taiwan

[21] Appl. No.: 928,156

[22] Filed: Nov. 6, 1986

[51] Int. Cl.$^4$ ............................................... F16D 1/00
[52] U.S. Cl. ...................................... 403/217; 403/171; 403/176; 403/295
[58] Field of Search ............... 403/297, 217, 170, 295, 403/171, 176

[56] References Cited

U.S. PATENT DOCUMENTS 3,822,101  7/1974  Schneider .......................... 403/295
4,076,438  2/1978  Bos .................................. 403/297 X Primary Examiner—Andrew V. Kundrat
Attorney, Agent, or Firm—Browdy and Neimark

[57] ABSTRACT

An improved shelf joint with a counter-sunk hexagonal slotted screw fitted axially in a body and having screw threads around the top edge and a conical face beneath the threads, and a round flat surface on the bottom where the conical face abuts against a sloping face of a thrust block, with a buffer spring against an opposite laterally placed face of that thrust block and the opposite side of the buffer spring pressed against a lateral face of a deviation block whose opposite face slopes against a complementary sloping face of a check block, pivotally held by a screw bolt in an extending shaft arm whereby the check block, when under pressure from the deviation block and screw, moves its sloping end which is against the deviation block, laterally outward through an opening in a side of the shaft arm thereby pressing against the inside wall of an oblong sleeve tubing which fits over the shaft arm holding the sleeve tightly to the joint, which sleeve supports a shelf. Such joints are shown with five shaft arms and may be modified to have different numbers of shaft arms to fit different particular applications.

6 Claims, 6 Drawing Figures

COMMODITY SHELF ADAPTORS

FIELD OF THE INVENTION

The present invention relates to shelf joints and particularly to shelf joints used to adapt shelves for the display of commodities.

BACKGROUND OF THE INVENTION

In consideration of the need to display commercial merchandise, to facilitate stock management in workshops or on warehouse commodity rack or shelf assemblies, racks and shelves have become indispensable which are easy to set up for use and which permit modification into various shapes and volumetric changes, if and when necessary, which are strong enough to support loads of given dimensions and weights. Such racks should be laid out in a pleasing manner so as to help to stimulate the desire to purchase items therefrom on the part of window-shoppers or passers-by.

It is well known that when a multitude of display shelves are assembled, differing in kinds and brands, those composed of two-way or three-way joints assembled with rectangular metal tubes, have often been found to lack the fit and precision required by the joints, which in turn is responsible for failure to meet rigid standards as regards compression strength. This renders the structures restricted in their scope of application.

FIG. 1 is an illustration of a prior art shelf joint. Joints or adaptors structured as such for use to form a commodity shelf or stand have been found to have the following shortcomings:

(1) the necessity to adjust the respective shaft arms of the joint separately, causing much waste of time and labor, and discouraging attempts to install the shelf;

(2) loosening of matching pieces as a result of frequent alteration of the loads stacked on the shelves, causing concerns for safety;

(3) loosening of the shelf by displacement also having concern for safety;

(4) unstable rocking of the shelf after several times use due to injury to the screw threads owing to strong torsion brought about by the dismantling and reassembling of the shelves.

Another type of joint for use with a commodity shelf having an outer diameter that is smaller than the inner diameter of the shelf tubework by a very minimal dimension can very often bring about injury while being coupled, there being a lack of any fastening of the fittings, and cause a falling of the finished shelf much more likely than with other types of joints.

SUMMARY OF THE INVENTION

The present invention attempts to overcome the shortcomings of the prior art devices.

Accordingly, the prime object of the present invention lies in the provision of structural improvements of a joint for commodity shelf stands which comprises a countersunk hexagonal slotted screw having a flat bottom to a conical body, which screw is contacted by thrust blocks present in shaft arm rails or within the inside walls of the shaft arms and with a buffer spring in each of the shaft arms exerting pressure on all elements in the shaft arms, oblong metal tubes fitted over the shaft arms allowing disassembly and re-assembly with ease and modification both in shape and dimension as necessary.

A further object of the present invention lies in structural improvements of the joints for commodity shelf stands wherein there is obtained a tight hold on the metal tube by its inner wall, thereby achieving an increased frictional resistance so that the shaft arm can serve reliably and rigidly for a long period of time, in the presence of heavy loads.

BRIEF DESCRIPTION OF THE DRAWINGS

Other features and advantages of the present invention will emerge from the following description and embodiments given by way of illustration, but not in any way limiting, with reference to the accompanying drawings in which.

DETAILED DESCRIPTION OF A PREFERRED EMBODIMENT

Figure 2:
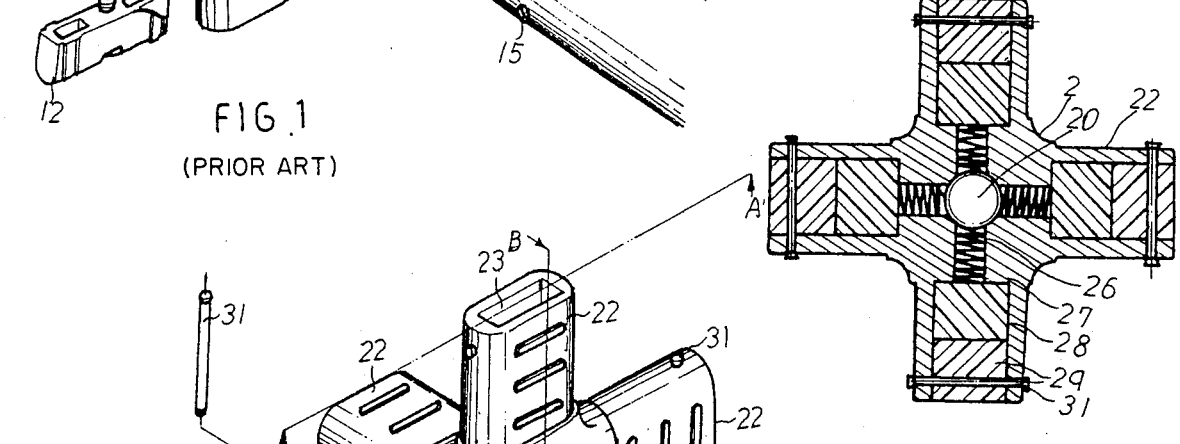
FIG. 2 is a front view perspective view of an improved shelf joint of the present invention.
Figure 6:
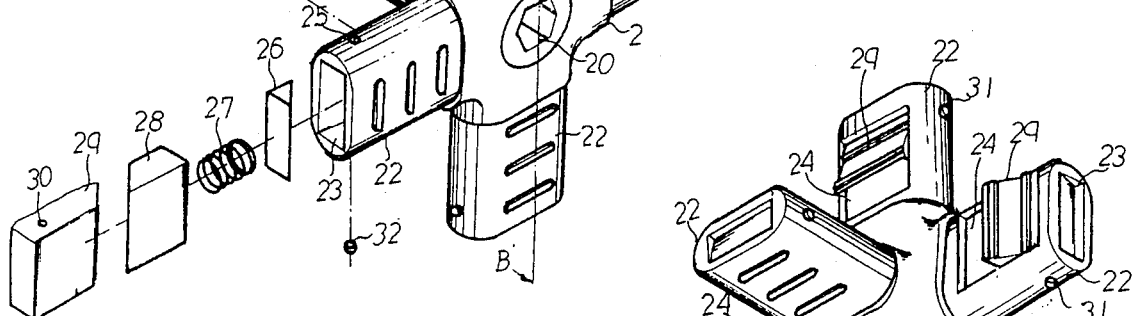
FIG. 6 is a sectioned view along a plane through line A—A of FIG. 2.

Referring to FIG. 2, which is a frontal perspective view of the present invention of an improved commodity shelf joint, it will be seen that the body 2 of the joint which may be a one piece body of cast metal, incorporates five shaft arms 22, each of which is composed of such elements as thrust block 26, buffer sprng 27, deviation block 28, and check block 29. A hexagonal slotted screw 20 is countersunk into the body 2, which altogether form a metal shelf joint, which with other such joints are used to assemble a commodity shelf stand, with connecting oblong metal tubes 14 by use of a sleeve-in engagement. A point to note here is that the body 2 may be formed in embodiments to have two shaft arms 22, to five shaft arms 22 as shown in the illustrated embodiment, to accommodate metal shelf tubes as required.

The body 2 incorporates a hexagonal slotted screw 20 as illustrated in FIGS. 2 and 4–6, having threads 21 provided only on the periphery of the top, and with a tapered surface from the threads 21 to the bottom surface forming a conical surface below those threads 21. Quadri-axially pointed thrust block 26 has a sloping lateral face configured to match and press against the conical surface of hexagonal slotted screw 20 so that a downward rotation of hexagonal slotted screw 20 serves to push the thrust block 26 outwards owing to the interactions binding upon the conical face of screw 20 with the sloping face of thrust block 26 so that the buffer spring 27 is compressed axially. Since the downward rotational action of hexagonal slotted screw 20 acts to compress the buffer springs 27 through thrust blocks 26 in all shelf arms 22 simultaneously, this allows equally distributed force in all axial directions of shelf arms 22 by virtue of the slope action of the conical portion of screw 20. Exposed threads are not used and therefore not subject to detrimental effects by virtue of this slope action.

For the shaft arm 22 extending axially from the hexagonal slotted screw 20, since screw 20 has a flat bottom surface, it is unnecessary to include thrust block 26, and the bottom flat surface of screw 20 directly contacts buffer spring 27 and compresses it in the manner as with the effect as in the other shaft arms 20 which extend radially from screw 20.

Figure 1:
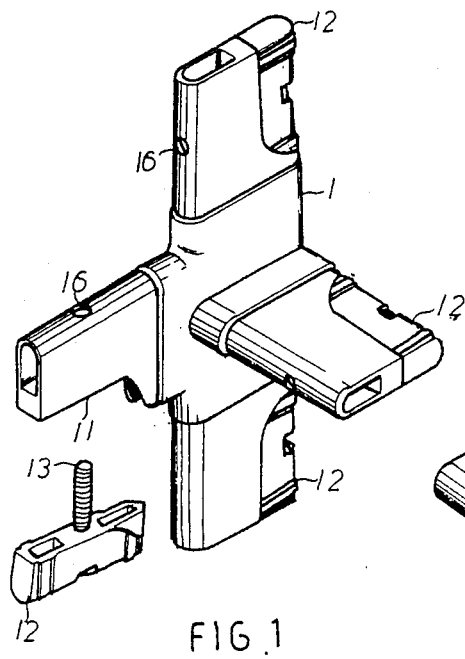
FIG. 1 is a perspective view of a conventional type of joint used to secure an iron tubular shelf stand or supported shelf stand.
Figures 4, 5:
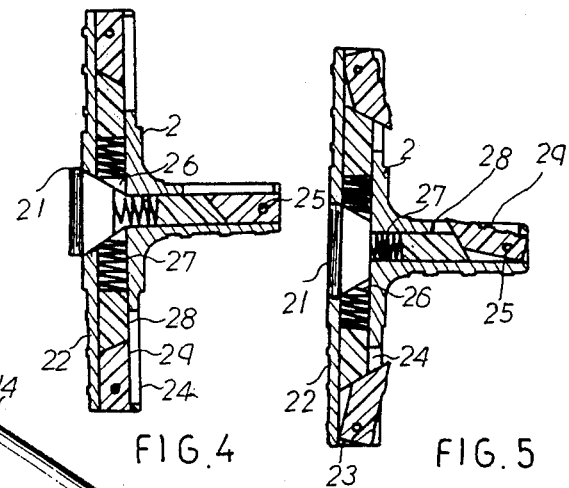
FIG. 4 is a side partially sectioned view along a plane through line B—B of FIG. 2.
FIG. 5 is a side partially sectioned view along a plane through line B—B of FIG. 2 with the countersunk screw inserted in the body.
Figure 3:
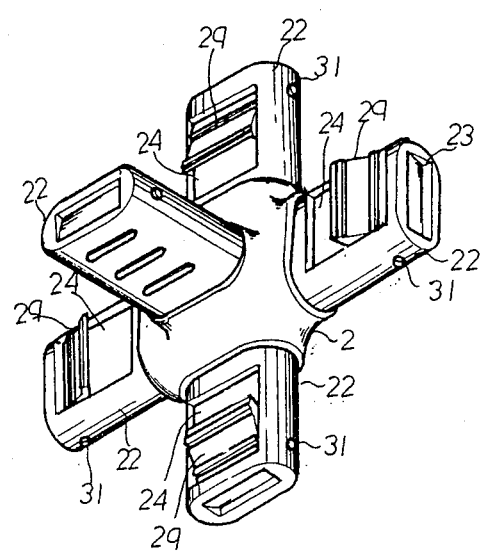
FIG. 3 is a perspective view, viewed at an angle from the back side, of the improved shelf joint of FIG. 2.

In use, hexagonal slotted screw 20 is first screwed into body 2 to facilitate the movement of the elements in the shaft arms 22 wherein the screw 20 moves its conical surface against thrust block 26 which, by its opposite lateral face which is perpendicular to the axial direction of the line of force, bears evenly against and compresses buffer spring 27. The buffer springs 27 serve to adjust the acting strength of respective shaft arms 22 when they are out of balance, thereby preventing the elements from being deformed or damaged by interactive extrusions binding upon elements and preventing fracture failure of the oblong metal tubes 14 owing to the relief of the force by movement of check block 29. When buffer spring 27 is compressed, pressure is exerted against deviation block 28 which in turn is forced against check block 29 along a rail formed by the inside walls 23 of shaft arms 22. A sloping face of deviation block 28 is forced against a complementary sloping face of check block 29. A screw bolt 31 passes through a round hole 25 in shaft arm 22, and then through a hole or passage 30 through check block 29 and through a hole in shaft arm 22 on the opposite side of passage 30 to be engaged by a screw nut 32. The force of the oppositely sloped faces of blocks 28 and 29 forces check block 29 to pivot on screw bolt 31 with the sloping end free to extend through lateral opening 24 in the side of each shaft arm 22 as shown in FIG. 5. On the outer extended surface which comes in contact with the inner walls of tube 14 there is a threaded surface on check block 29, best shown in FIG. 3.

Assembling of the unit is easily performed. This is accomplished by matching an oblong tube 14 to be fitted on each of shaft arms 22, and then with a hexagonal allen wrench in the opening in screw 20, the screw 20 is tightened causing check blocks 29 to pivot outwardly through openings 24 in each of the shaft arms 22 against the inner walls of tubes 14 to lock the tubes 14 onto shaft arms 22 by the frictional resistance between threaded endings on check blocks 29 and the walls of tubes 14. These extended ends of check blocks 29 are shown in their extended positions in FIGS. 3 and 5.

To disassemble, merely rotate screw 20 in the opposite diretion, causing check blocks 29 to retreat into openings 24 by release of the force on deviation block 28, by release of compression on buffer spring 27 through movement of thrust block 26 inwardly toward screw 20 as screw 20 is rotated outwardly of its countersunk position to its position shown in FIG. 4. At this point there is no longer any pressure against the oblong metal tube 14.

In short, the device of the present invention is strong in its structure and is easily assembled, disassembled, and reassembled.

In summary, employment of the improved commodity shelf joint of the present invention, for the installation of a commodity shelf stand, has a number of advantages such as the following:

(1) substantial saving of time and labor in the course of installation;

(2) a long service time for the shelf stand without getting loose or slack;

(3) the installation is assured of rigid fastening to meet safety requirements; and (4) freedom from detrimental effects to the parts constituting the device.

What is claimed is:

1. An improved shelf joint for use in a commodity shelf rack or stand comprising
    a body of the joint;
    a screw for insertion into said body, said screw including
        top and bottom surfaces,
        a threaded portion around the periphery of said top surface,
        a conical surface between said threaded portion and said bottom surface;
    a plurality of shaft arms extending from said body incorporated onto said body and having a hollow passage through each of said shaft arms and a side opening in communication with said hollow passage;
    each of said shaft arms having located therein in said hollow passage and extending in a radial direction from said screw
        a thrust block having a sloping face facing toward said conical surface of said screw and in contact with said conical surface and a flat face perpendicular to said radial direction from said screw,
        a buffer spring with its axis extending along said radial direction from said screw and having one end for contacting said flat face of said thrust block,
        a deviation block mounted for movement along said radial direction from said screw having a flat face for contacting said buffer spring on an opposite end of said buffer spring from the end for contacting said thrust block and having a sloping face on its opposite side from its said flat face,
        and a check block pivotally mounted in said shaft arm near one end of said check block and having a sloping face on the opposite end from where it is pivotally mounted wherein said sloping face of said check block contacts and moves along said sloping face of said deviation block to a position outside said shaft arm extending through said side opening in said shaft arm communicating with said hollow passage within said shaft arm.

2. The improved shelf joint of claim 1 further comprising
    a means for pivotally mounting said check block in said shaft arm including
        a passage extending through said check block in a plane parallel to a plane including said sloping face of said check block,
        said shaft arm having holes therethrough located axially along the axis of said passage extending through said check block,
        bolt means extending through said shaft arm holes and said passage through said check block to form said means for pivotally mounting said check block in said shaft arm.

3. The improved shelf joint of claim 1 further comprising
    said bottom surface of said screw being a substantially flat surface;
    a shaft arm extending axially from said screw and having located therein a hollow passage extending axially from said screw and a side opening in communication with said hollow passage;

said shaft arm extending axially from said screw including in said hollow passage therein extending in an axial direction from said screw
- a buffer spring having one end for contacting said bottom flat surface of said screw,
- a deviation block mounted for movement along said axial direction from said screw having a flat face for contacting said buffer spring on an opposite end of said buffer spring from the end for contacting said bottom flat surface of said screw and having a sloping face on its opposite side from its said flat face,
- and a check block pivotally mounted in said shaft arm near one end of said check block and having a sloping face on the opposite end from where it is pivotally mounted wherein said sloping face of said check block contacts and moves along said sloping face of said deviation block to a position outside said shaft arm extending through said side opening in said shaft arm communicating with said hollow passage within said shaft arm.

4. The improved shelf joint of claim 3 wherein said buffer springs are means to equalize the forces against all of said check blocks.

5. The improved shelf joint of claim 1 wherein said shaft arms are shaped to receive an oblong tube fitted as a sleeve over each of said shaft arms.

6. The improved shelf joint of claim 5 wherein said check blocks each have projecting threads on a flat face extending through said side openings in said shaft arms to press against an inner surface of the oblong tube when said check blocks extend through said side openings in said shaft arms.

* * * * *